Patented Jan. 18, 1944

2,339,583

UNITED STATES PATENT OFFICE 2,339,583

PROCESS FOR THE PREPARATION OF 4-ACYLAMIDO-2-HYDROXYPHENYL-ARSEN-OXIDES

Montague Alexander Phillips, Romford, England, assignor to May & Baker Limited, Dagenham, Essex, England, a British company No Drawing. Application April 2, 1942, Serial No. 437,378. In Great Britain January 24, 1941

8 Claims. (Cl. 260—440)

This invention relates to a process for the preparation of 4-acylamido-2-hydroxyphenyl-arsenoxides, especially the 4-acetylamido compound.

4 - acetylamido - 2 - hydroxyphenyl - arsenoxide is a useful intermediate for the preparation of a number of organic arsenic compounds of therapeutic interest. If this compound be produced by the method usual hitherto, namely by reduction of the corresponding arsonic acid with sulphurous acid then, largely owing to the instability of the arsenic-carbon linkage in this particular type of compound, the yields obtained are small and are liable to considerable variation.

It is the object of the present invention to provide a process for the production of the aforesaid compounds by which consistently good yields are obtainable.

The process according to the present invention comprises reacting in aqueous solution a neutral soluble salt of a phenylarsenoxide or phenylarsenious acid, the benzene ring of which oxide or acid contains an acidic group, with a neutral soluble salt of an arylthioarsinite of the general formula:

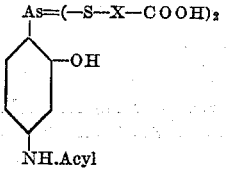

wherein X represents a benzenoid radical (preferably a benzene radical) or an aliphatic radical. The acyl group is preferably an acetyl group.

The phenylarsenoxide or phenylarsenious acid may conveniently contain, as the acidic group, a carboxylic acid group and may, if desired, contain also other substituents in the benzene ring. Examples of such compounds are: p-benzarsenious acid, 3-carboxy-4-methoxy-phenyl arsenious acid or 4-acetamido-3-carboxyphenyl-arsenoxide. Examples of arylthioarsinites having the general formula given above are: di-(carboxymethyl) - 4 - acetamido - 2 - hydroxyphenylthioarsinite, di(o - carboxyphenyl) - 4 - acetamido - 2 - hydroxyphenylthioarsinite and di(3 - carboxy - 4 - methoxyphenyl) - 4 -acetamido - 2 - hydroxyphenyl - thioarsinite. These arylthioarsinites can all be obtained from 4-acetamido-phenylarsonic acid and thiolacetic acid, o-thiolbenzoic acid and 5-thiol-2-methoxybenzoic acid, respectively, by the method of Barber (J. C. S., 1929, 1020).

In carrying out the process of the present invention the said phenylarsenoxide or phenylarsenious acid and the said arylthioarsinite are reacted each in the form of a neutral salt soluble in water. Salts with the alkali metals (especially the sodium salts), conveniently prepared by careful neutralisation of the acidic compounds with the corresponding base e. g. sodium hydroxide, are preferred.

In the preparation of 4-acetamido-2-hydroxyphenyl arsenoxide by the interaction of a sodium salt of a carboxyphenyl-arsenoxide or -arsenious acid and an aryl-thioarsinite (having the said general formula in which Acyl represents the acetyl group) it has been found that best results are obtained by effecting reaction at normal room temperature; in any event it is desirable not to exceed 35° C.

The reaction is illustrated by the following equation:

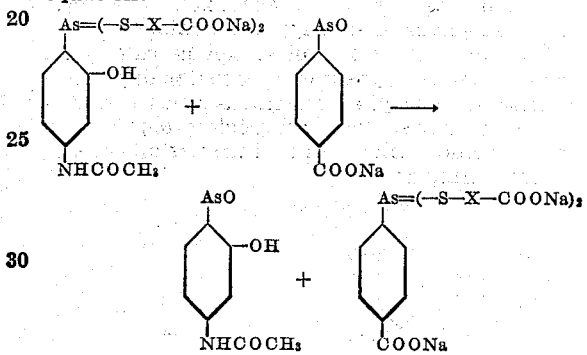

The present invention is illustrated by the following examples.

Example I 120 grams of di-(carboxymethyl)-4-acetamido - 2 - hydroxy - phenylthioarsinite (M. Pt. 160–161° C.) were suspended in 600 cc. of water and then carefully neutralised to litmus by the addition of caustic soda solution. To the solution so obtained there was added a similarly prepared, neutral solution containing the equivalent (in the form of the sodium salt) of 65 grams of p-benzarsenious acid in 600 cc. of water. The temperature did not exceed 35° C. during the reaction. 4-acetamido-2-hydroxyphenyl-arsenoxide hemi-hydrate which precipitated was filtered off, washed with water and dried in a vacuum over sulphuric acid.

Example II 26.5 grams of di(o-carboxyphenyl)-4-acetamido-2-hydroxyphenylthioarsinite (M. Pt. 186°

C.) were suspended in 50 cc. of water and then carefully neutralised to litmus with caustic soda solution. The resulting solution was added to a similarly neutralised solution containing the equivalent of 13.5 grams of 4-acetamido-3-carboxy-phenyl-arsenoxide in 50 cc. of water at a temperature below 35° C. when 4-acetamido-2-hydroxyphenyl-arsenoxide hemi-hydrate separated out. The precipitate was treated as in Example I.

*Example III*

A neutral solution of di(3-carboxy-4-methoxyphenyl) - 4 - acetamido - 2 - hydroxyphenyl-thioarsinite (M. Pt. 208° C.) in 0.5 N sodium hydroxide was added to a solution of one equivalent of p-benzarsenious acid in 0.5 N sodium hydroxide. The precipitate of 4-acetamido-2-hydroxy-phenylarsenoxide hemi-hydrate which separated was treated as in Example I.

I claim:

1. A process for the preparation of 4-acylamido - 2 - hydroxy-phenyl arsenoxides, which comprises reacting a neutral soluble salt of an acid selected from the group consisting of phenylarsenoxides and phenylarsenious acids containing in the benzene ring an acidic group, with a neutral soluble salt of an aryl thioarsinite of the general formula:

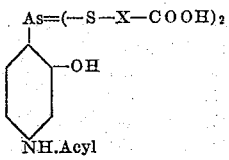

wherein X represents a radical selected from the group consisting of aromatic and aliphatic radicals.

2. A process for the preparation of 4-acylamido - 2 - hydroxy-phenyl arsenoxides, which comprises reacting a neutral soluble salt of an acid selected from the group consisting of phenylarsenoxides and phenylarsenious acids containing in the benzene ring an acidic group, with a neutral soluble salt of an aryl thioarsinite of the general formula:

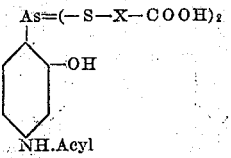

wherein X represents a benzene radical.

3. A process for the preparation of 4-acylamido - 2 - hydroxy-phenyl arsenoxides, which comprises reacting a neutral soluble salt of an acid selected from the group consisting of phenylarsenoxides and phenylarsenious acids containing in the benzene ring an acidic group with a neutral soluble salt of an aryl thioarsinite of the general formula:

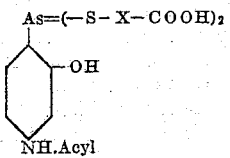

wherein X represents an aliphatic radical.

4. A process for the preparation of 4-acylamido - 2 - hydroxy-phenyl arsenoxides, which comprises reacting, in aqueous solution, a neutral soluble salt of an acid selected from the group consisting of phenylarsenoxides and phenylarsenious acids containing in the benzene ring an acidic group with a neutral soluble salt of an aryl thioarsinite of the general formula:

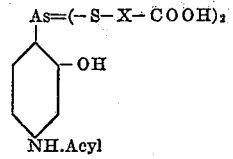

wherein X represents a radical selected from the group consisting of aromatic and aliphatic radicals.

5. A process for the preparation of 4-acetamido - 2 - hydroxy-phenyl arsenoxide, which comprises reacting, in aqueous solution, a neutral soluble salt of an acid selected from the group consisting of phenylarsenoxides and phenylarsenious acids containing in the benzene ring an acidic group with a neutral soluble salt of an aryl thioarsinite of the general formula:

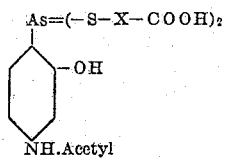

wherein X represents a radical selected from the group consisting of aromatic and aliphatic radicals.

6. A process for the preparation of 4-acylamido - 2- hydroxy-phenyl arsenoxides, which comprises reacting, in aqueous solution, a neutral soluble salt of an acid selected from the group consisting of phenylarsenoxides and phenylarsenious acids containing in the benzene ring a carboxylic acid group with a neutral soluble salt of an aryl thioarsinite of the general formula:

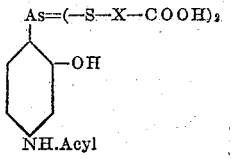

wherein X represents a radical selected from the group consisting of aromatic and aliphatic radicals.

7. A process for the preparation of 4-acetamido - 2 - hydroxy-phenyl arsenoxide, which comprises reacting, in aqueous solution, a neutral soluble salt of an acid selected from the group consisting of phenylarsenoxides and phenylarsenious acids containing in the benzene ring a carboxylic acid group with a neutral salt of an aryl thioarsinite of the general formula:

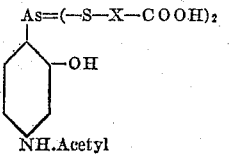

wherein X represents a radical selected from the group consisting of aromatic and aliphatic radicals.

8. A process as claimed in claim 4, wherein the reaction is carried out at normal room temperature.

MONTAGUE ALEXANDER PHILLIPS.